(12) United States Patent
Eguchi et al.

(10) Patent No.: US 6,588,722 B2
(45) Date of Patent: Jul. 8, 2003

(54) SEAT SLIDE APPARATUS

(75) Inventors: Moriyuki Eguchi, Kanagawa-ken (JP); Ryo Fujimoto, Kanagawa-ken (JP); Tomonori Yoshida, Kanagawa-ken (JP)

(73) Assignee: Johnson Controls Automotive Systems Corporation, Ayase (JP)

( * ) Notice: Subject to any disclaimer, the term of this patent is extended or adjusted under 35 U.S.C. 154(b) by 0 days.

(21) Appl. No.: 09/998,942

(22) Filed: Nov. 15, 2001

(65) Prior Publication Data

US 2002/0056798 A1 May 16, 2002

(30) Foreign Application Priority Data

Nov. 16, 2000 (JP) .................................... 2000-349636
Jan. 17, 2001 (JP) .................................... 2001-009332

(51) Int. Cl.$^7$ ............................................. F16M 13/00
(52) U.S. Cl. .................. 248/429; 248/298.1; 297/318
(58) Field of Search ............... 248/429, 430, 248/424, 298.1; 297/341, 318, 314

(56) References Cited

U.S. PATENT DOCUMENTS

| | | | | |
|---|---|---|---|---|
| 4,511,187 A | | 4/1985 | Rees | 308/3.8 |
| 4,533,107 A | * | 8/1985 | Okazaki et al. | 248/430 |
| 4,602,758 A | | 7/1986 | Mann et al. | 248/430 |
| 4,621,784 A | | 11/1986 | Kaesling et al. | 248/430 |
| 4,809,939 A | | 3/1989 | Matsushima et al. | 248/430 |
| 5,046,698 A | * | 9/1991 | Venier | 248/429 |
| 5,048,787 A | * | 9/1991 | Saitoh | 248/430 |
| 5,137,244 A | * | 8/1992 | Negi | 248/429 |
| 5,192,045 A | * | 3/1993 | Yamada et al. | 348/429 |
| 5,213,300 A | | 5/1993 | Rees | 248/429 |
| 5,522,665 A | | 6/1996 | Baloche et al. | 384/47 |
| 5,582,381 A | * | 12/1996 | Graf et al. | 248/430 |
| 5,692,839 A | | 12/1997 | Rohee et al. | 384/47 |
| 6,116,561 A | | 9/2000 | Christopher | 248/429 |
| 6,152,415 A | | 11/2000 | Seki et al. | 248/430 |
| 6,189,852 B1 | | 2/2001 | Hopley et al. | 248/430 |
| 6,220,642 B1 | * | 4/2001 | Ito et al. | 248/429 |
| 6,416,130 B2 | | 7/2002 | Yamada et al. | 297/344.11 |
| 6,422,526 B1 | * | 7/2002 | Ishikawa et al. | 248/430 |
| 6,435,465 B1 | | 8/2002 | Yamada et al. | 248/429 |
| 6,497,397 B2 | | 12/2002 | Fujimoto et al. | 248/430 |
| 2001/0006209 A1 | | 7/2001 | Yoshida et al. | 248/429 |
| 2001/0013570 A1 | | 8/2001 | Yoshida et al. | 248/429 |
| 2001/0015401 A1 | | 8/2001 | Yoshida et al. | 248/430 |
| 2002/0008183 A1 | * | 1/2002 | Mallard et al. | 248/429 |
| 2002/0036254 A1 | | 3/2002 | Eguchi et al. | 248/429 |

FOREIGN PATENT DOCUMENTS

| | | | |
|---|---|---|---|
| DE | 41 33 509 A1 | 4/1993 | |
| DE | 196 48 170 C1 | 7/1997 | |
| EP | 0 922 606 A1 | 6/1999 | |
| EP | 1 116 624 A2 | 7/2000 | |
| EP | 1 116 623 | 7/2001 | ................ 2/7 |
| JP | 7-164933 | 6/1995 | |
| JP | 7-215105 | 8/1995 | |

* cited by examiner

Primary Examiner—Ramon O. Ramirez
Assistant Examiner—A. Joseph Wujciak, III
(74) Attorney, Agent, or Firm—Foley & Lardner

(57) ABSTRACT

Roller receiving step portions (12f) are formed in both sides of a bottom portion of a main body portion (12a) in a lower rail (12). A roller (27) is inserted between the step portions (12f) in the lower rail (12) and an upper wall (13d) in an upper rail (13). Left and right roller portions (27A, 27B) are formed so as to be separated into left and right sections in a substantially center portion of the roller (27). An elastic washer (28) corresponding to an elastic body is inserted to a roller shaft (47c) at the separated position of the roller (27). Taper surfaces (41) are formed in both side portions (27a) of the roller (27) and are mounted on taper surfaces (43) formed in the step portions (12f) in the lower rail (12) and downward inclined toward a center in a width direction.

12 Claims, 11 Drawing Sheets

FIG.1
(Conventional)

FIG.2
(Conventional)

SEAT SLIDE APPARATUS

BACKGROUND OF THE INVENTION

1. Field of the Invention

The present invention relates to a seat slide apparatus, and more particularly to a seat slide apparatus comprising a lower rail mounted along a longitudinal direction of a vehicle floor surface and an upper rail guided and supported on the lower rail so as to freely slide in a longitudinal direction and mounted and fixed to a side of a seat main body.

2. Description of the Related Art

In general, a seat for a vehicle is provided with a seat main body constituted by a seat cushion, a seat back stood at the back thereof so as to be freely rotated and adjusted, and the like, and supports the seat cushion or the like constituting the seat main body on the vehicle body floor surface via a longitudinal slide mechanism, thereby being structured such as to be adjusted so as to freely slide in a longitudinal direction of the vehicle body and being formed so as to variously modify a layout of the seat within a passenger's room.

Further, as a longitudinal slide mechanism for the seat mentioned above, there is employed a seat slide apparatus which is formed to be long in the longitudinal direction on the vehicle body floor surface, is mounted on the vehicle body floor surface and is constituted by a lower rail provided substantially in the same height as that of a surface of a floor carpet and an upper rail mounted and fixed to the seat main body.

Figure 1:
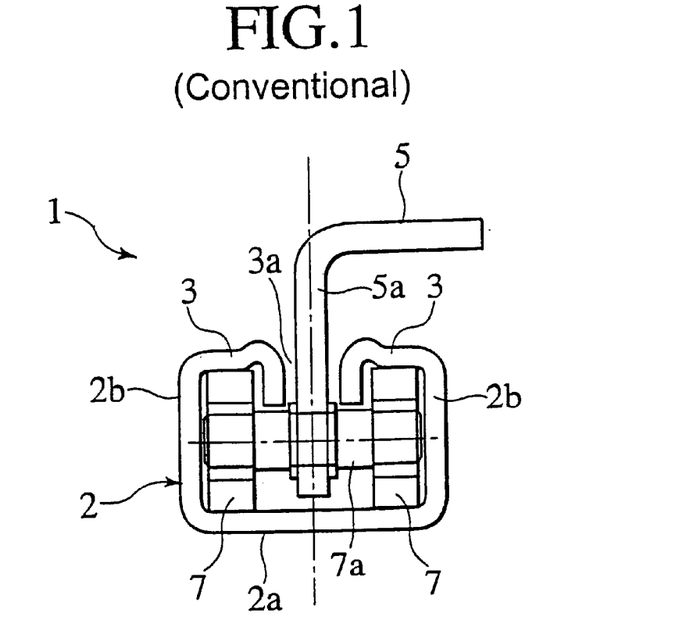
FIG. 1 is a schematic cross sectional view of a conventional seat slide apparatus.
Figure 2:
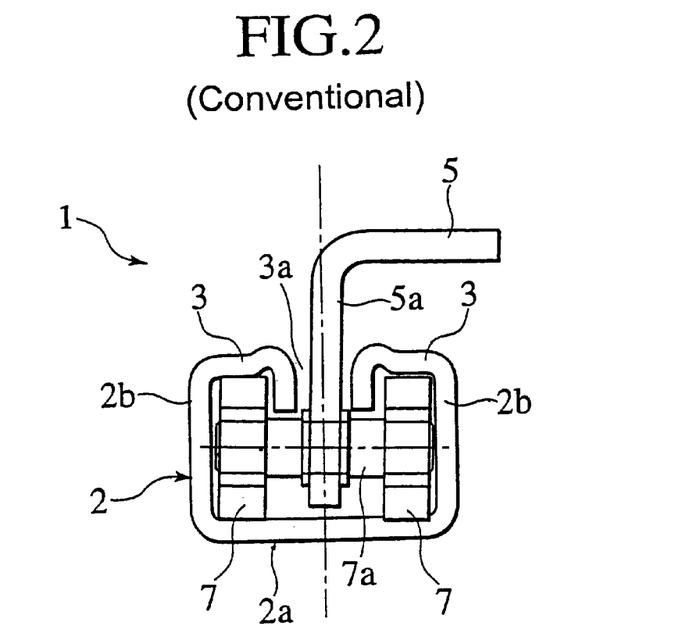
FIG. 2 is a schematic cross sectional view of a state of incline of a roller in the conventional seat slide apparatus.

As shown in FIGS. 1 and 2, in a conventional general seat slide apparatus 1, a pair of left and right lower rails 2 are provided with main body portions 2a made by a metal plate member and formed in a substantially upward-C shape, and a pair of left and right engagement portions 3 inward bent from front end sides of both of side portions 2b of the main body portions 2a and downward directed at front end sides, thereby forming opening portions 3a at end portions of the engagement portions 3.

A pair of left and right upper rails 5 in the seat slide apparatus 1 are formed in a substantially inverse-T shape so as to be assembled in the lower rails 2, and engaged portions are formed in both side portions upward bent from front end sides of horizontal portions in the upper rails 5. The engaged portions are assembled so as to be capable of engaging with the engagement portions 3 in the side of the lower rails 2.

Further, substantially inverse-T shaped vertical portions 5a of the upper rails 5 protrude upward from the opening portions 3a of the lower rail 2, and anchor members, shafts of a seat lifter, bases of a reclining mechanism and the like are mounted thereto. Rollers 7 are inserted between the lower rails 2 and the upper rails 5 by being supported by roller shafts 7a.

When the rollers 7 are interposed between the lower rails 2 and the upper rails 5 so as to be slidably supported, as mentioned above, it is possible to at a certain level prevent problems that a sliding resistance is rapidly increased or reduced, that an abnormal noise at a time of operating, a malfunction due to a fluctuation of a sliding resistance caused by a load and the like are generated, and the like, in comparison with a conventional structure obtaining a sliding function on the basis of a simple slide between metal surfaces.

However, in the case that the conventional seat slide apparatus 1 as mentioned above is formed long, it is complex to work the respective portions, and there is a problem of rattle in the respective portions due to a size error or the like, so that there is a disadvantage that it is impossible to absorb a size dispersion in the vehicle and the respective portion of the seat. As shown in FIG. 2, when a slope is generated in the roller 2 between the lower rail 2 and the upper rail 5, there is a risk that a slide operating force is increased, whereby there is generated a trouble such that a smooth slide motion of the upper rail 5 can not be obtained.

Further, when setting a clearance to be large in order to prevent the sliding resistance from being increased, there is a risk that the rattle is generated, and it is necessary to select and fit rollers and sliders having different sizes due to the size dispersion of the respective slide parts, so that there is a disadvantage that a number of the parts is increased and a parts control becomes troublesome.

SUMMARY OF THE INVENTION

The present invention is made by taking the problems mentioned above into consideration, and an object of the present invention is to provide a seat slide apparatus which can absorb a size dispersion in a vehicle and respective parts of a seat, has a simple structure, requires no increase of a number of new parts and no additional operation, is inexpensive, can easily and rapidly execute a mounting operation, can obtain a smooth and stable sliding motion, and can reduce a sliding resistance so as to improve an operability.

According to a first aspect of the present invention, there is provided a seat slide apparatus comprising:

a lower rail mounted to be long in a longitudinal direction of a seat mounting floor surface; and an upper rail guided and supported so as to freely slide in a longitudinal direction on the lower rail and mounted and fixed to a side of a seat main body, wherein the lower rail is provided with a main body portion formed in a substantially upward-C shape and a pair of right and left upper side portions extended inward from front end sides of both side portions in the main body portion so as to form an opening portion, and roller receiving step portions are formed in both sides of a bottom portion in the main body portion, wherein the upper rail has a main body portion formed in a substantially downward-C shape so as to be assembled in the lower rail, and a vertical wall protruding upward from a center of an upper wall in the main body portion and protruding upward from the opening portion of the upper side portion in the lower rail, and wherein a roller is inserted between a step portion of the bottom portion in the main body portion of the lower rail and the upper wall in the main body portion of the upper rail, the roller is pivoted to roller shafts mounted to both side portions in the main body portion of the upper rail, and separated into right and left sections at a substantially center portion of the roller, and both side portions of the roller are mounted to the step portion of the bottom portion is the main body portion of the lower rail.

Further, in addition to the structure mentioned above, the lower rail may be structured such that a circular arc surface is formed in the roller receiving step portion, and a slider receiving portion is formed in a lower surface side of the upper side portion, and further, in the seat slide apparatus in which the slider receiving portion is provided in an upper end of the upper wall in the upper rail main body, both side portions of the roller may be mounted on a taper surface downward inclined toward a center portion in a width direction formed in the step portion of the bottom portion in the main body portion of the lower rail. Further, both side portions of the roller may be formed so as to have a larger diameter than that of the center portion, or the structure may be made such that an elastic body is inserted to the center portion. Further, the elastic body may be constituted by an elastic washer.

DETAILED DESCRIPTION OF THE PREFERRED EMBODIMENTS

A description will be in detail given below of a seat slide apparatus according to the present invention with reference to the accompanying drawings.

Figure 3:
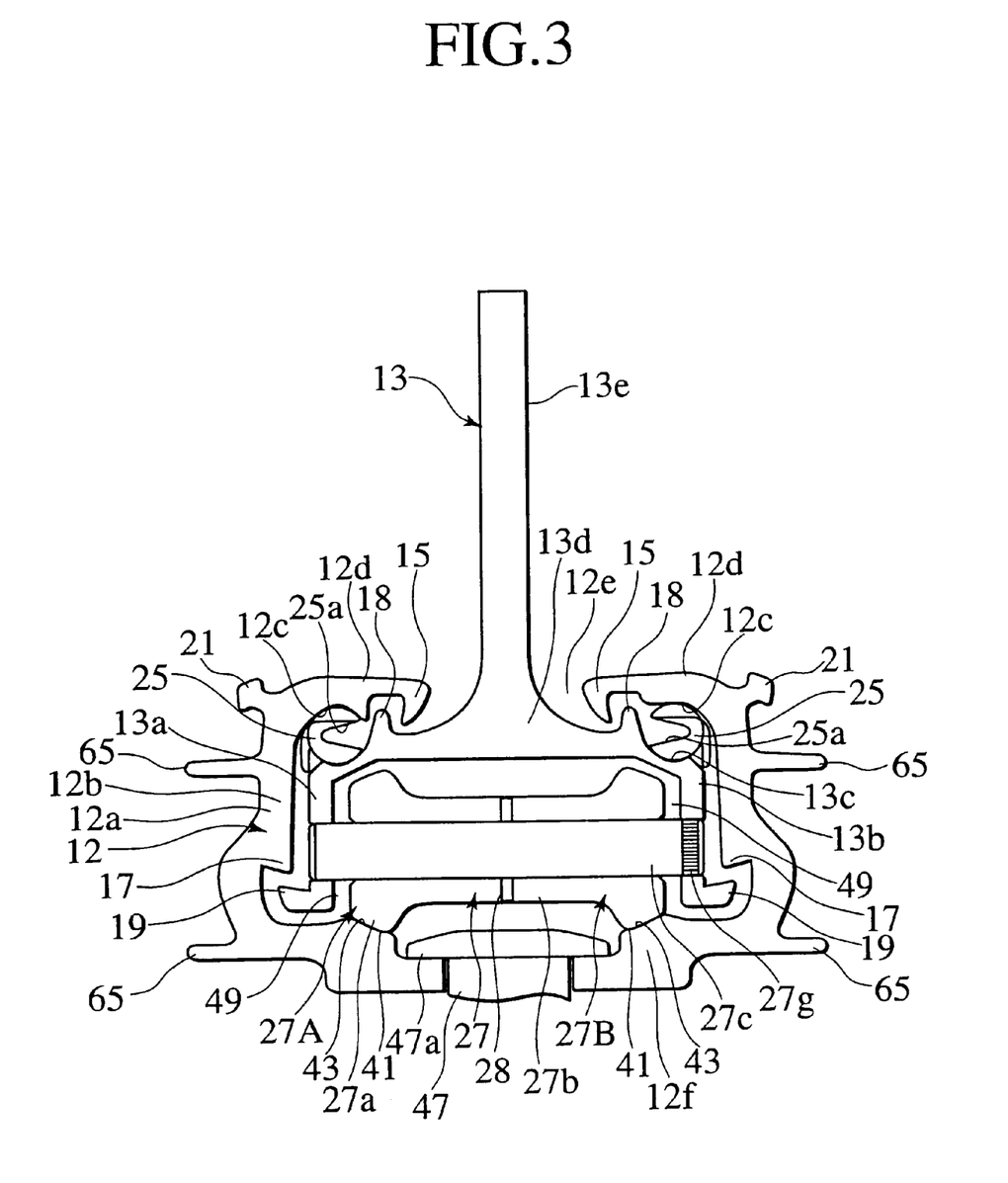
FIG. 3 is a cross sectional view of a main portion showing a first embodiment of a seat slide apparatus according to the present invention.
Figure 4:
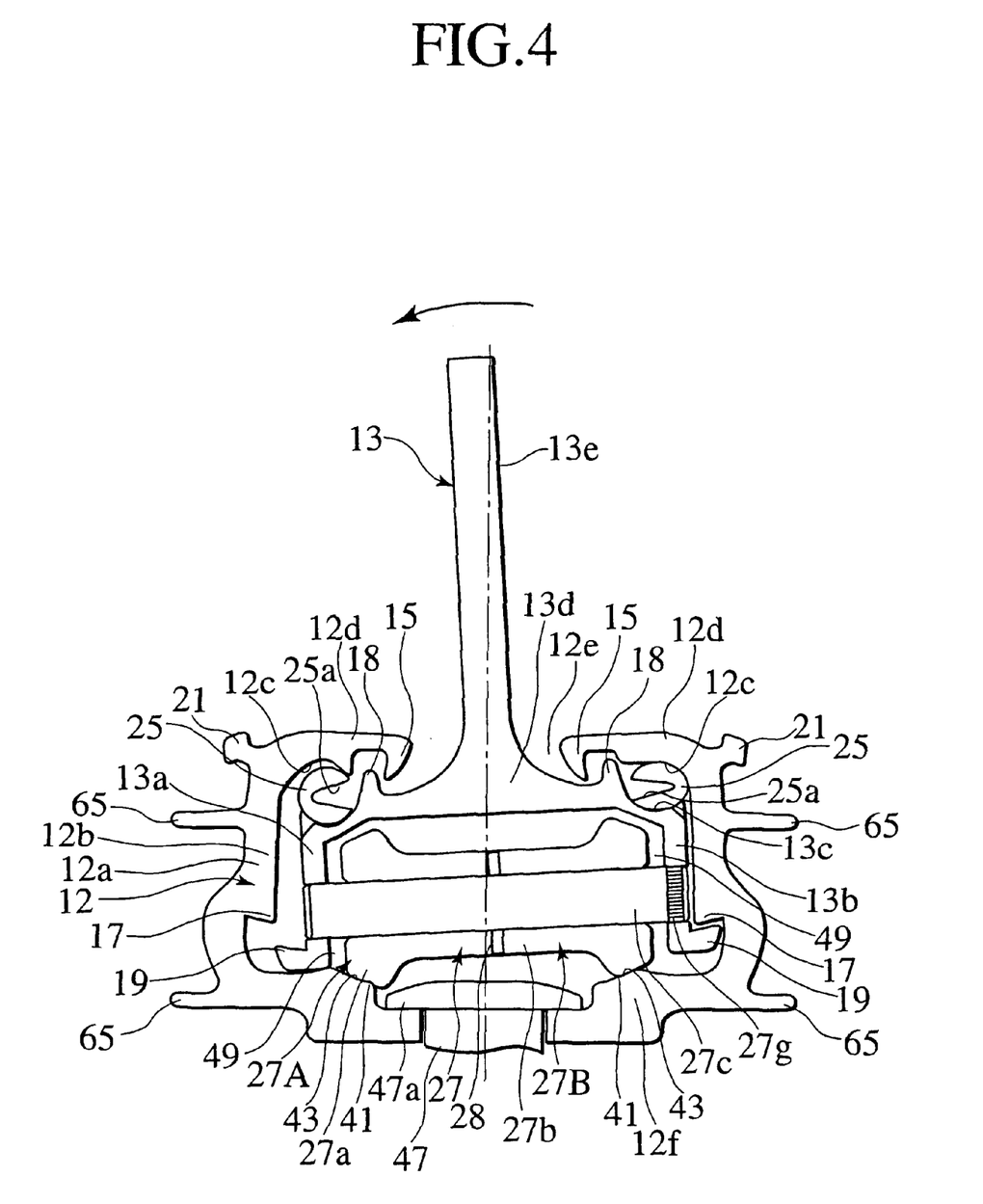
FIG. 4 is a cross sectional view of a state that an upper rail in the seat slide apparatus shown in FIG. 3 is inclined.
Figure 5:
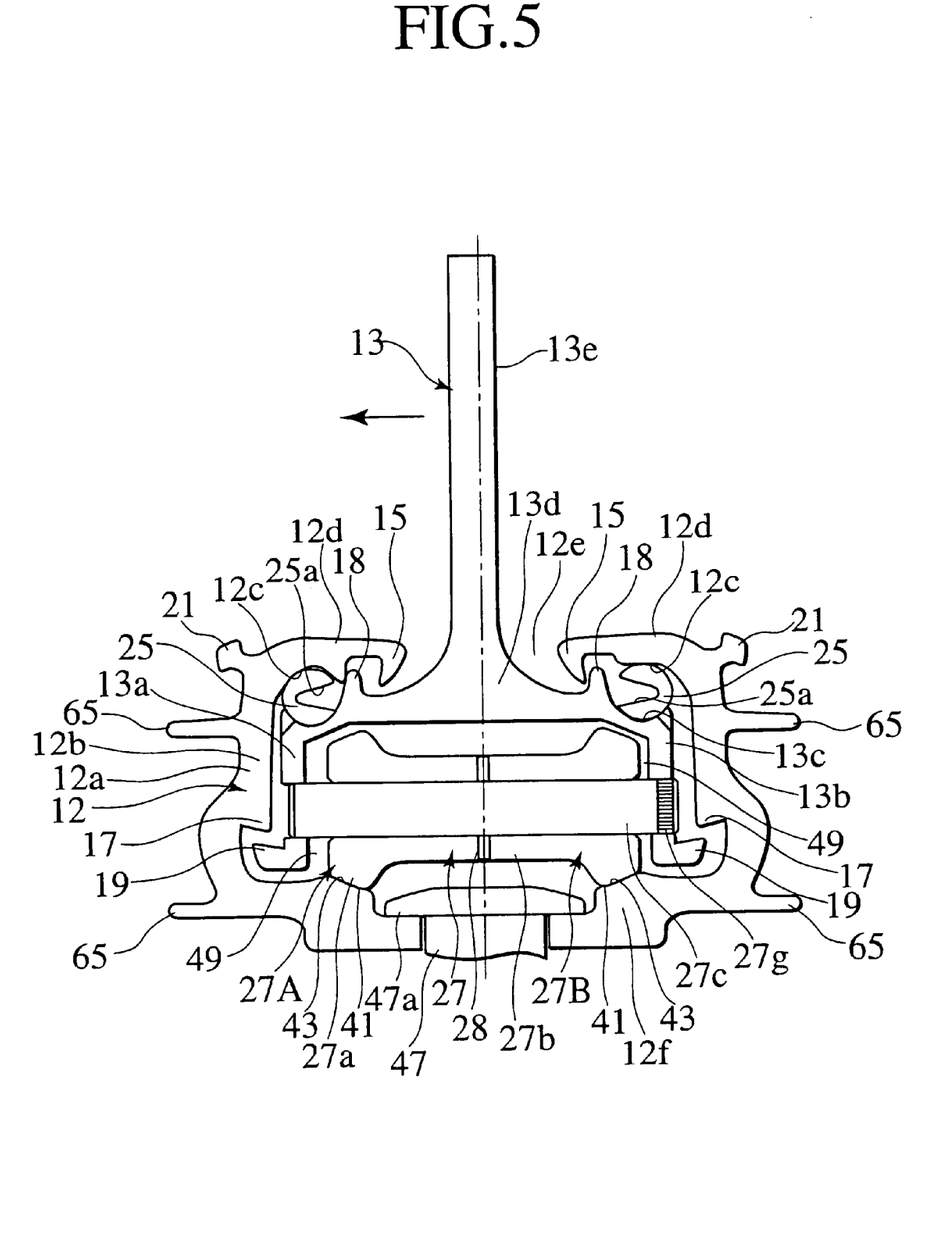
FIG. 5 is a cross sectional view of a state that the upper rail in the seat slide apparatus shown in FIG. 3 moves laterally.
Figure 6:
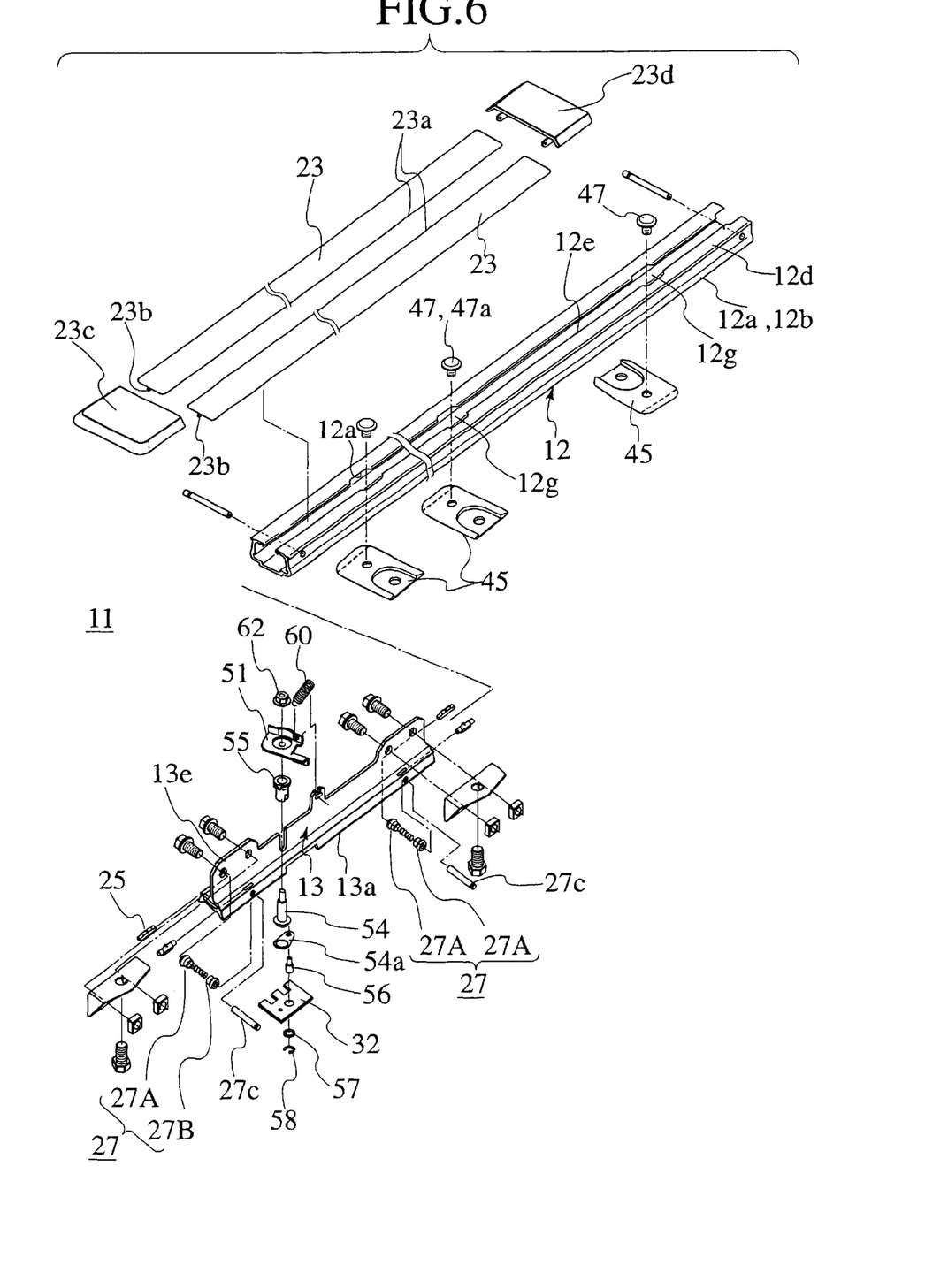
FIG. 6 is an exploded perspective view of the seat slide apparatus shown in FIG. 3.

FIGS. 3 to 6 respectively show an embodiment according to the present invention, in which FIG. 3 shows a cross sectional shape of a seat slide apparatus corresponding to a main portion of the present invention, FIG. 4 is a cross sectional view of a state that an upper rail in the seat slide apparatus shown is inclined, FIG. 5 is a cross sectional view of a state that the upper rail in the seat slide apparatus moves laterally, and FIG. 6 is an exploded perspective view.

A seat slide apparatus 11 is interposed between a seat main body (not shown) constituted on a vehicle body floor by a seat cushion, a seat back and the like, and the vehicle body floor surface, and is used for supporting the seat main body so as to freely slide in a longitudinal direction of the seat, as well known.

As shown in FIGS. 3 and 6, the seat slide apparatus 11 is provided with a lower rail 12 mounted on a seat mounting floor surface so as to be long in a longitudinal direction, and an upper rail 13 guided and supported on the lower rail 12 so as to freely slide in a longitudinal direction and mounted and fixed to a side of a seat main body.

The seat slide apparatus 11 is formed from a light alloy such as an aluminum die cast, a magnesium alloy or the like according to an extrusion molding. In this case, it may be a hard synthetic resin molded product. Further, the lower rail 12 may be in a state of being inserted into a notch portion of a floor carpet or may be provided with a leg.

The lower rail 12 is provided with a main body portion 12a formed in a substantially upward-C shape, a pair of right and left upper side portions 12d and 12d extended by being bent inward from a front end side of both side portions 12b and 12b of the main body portion 12a so as to form an opening portion 12e, and slider receiving portions 12c and 12c formed in inner sides of outer front ends of a pair of right and left upper side portions 12d and 12d, and roller receiving step portions 12f and 12f are formed in both sides of a bottom portion of the main body portion 12a.

The upper rail 13 has a main body portion 13a formed in a substantially downward-C shape so as to be assembled in the lower rail 12, slider receiving portions 13c and 13c formed in outer upper portions of both side portions 13b and 13b in the main body portion 13a, and a vertical wall 13e protruding upward from a center of upper walls 13d and 13d in the main body portion 13 and protruding upward from the opening portion 12e of the upper side walls 12d and 12d in the lower rail 12. A latch 32 corresponding to a lock mechanism is provided between the upper rail 13 and the lower rail 12.

As shown in FIG. 3, a first hook portion 15 is formed at a front end portion in a side of the opening portion 12e of the main body portion 12a in the lower rail 12, and second hook portions 17 and 17 are formed in both side portions 12b and 12b in the main body portion 12a, respectively. Further, finisher mounting portions 21 and 21 are formed near connecting portions between the upper ends of both end portions 12b and 12b in the lower rail 12 and a pair of right and left upper side portions 12d and 12d so as to protrude obliquely upward, and finishers 23 and 23 are mounted to the finisher mounting portion 21.

The finisher 23 is formed by a synthetic resin material, a soft lip portion 23a is formed in an inner side thereof and an engagement portion 23b is formed in a back surface side of the finisher 23. The engagement portion 23b is engaged with the finisher mounting portion 21, whereby the lip portion 23a is brought into contact with a vertical wall 23e protruding upward from the opening portion 22e, and the opening portion 12e of the upper side portions 12d and 12d in the lower rail 12 is shielded. In this case, end caps 23c and 23d are mounted to front and rear end portions of the finisher 23 (refer to FIG. 6).

As shown in FIG. 3, first engagement portions 18 and 18 engaged with first hook portions 15 and 15 of the lower rail 12 are respectively formed in the upper walls 13d and 13d of the main body portion 13a in the upper rail 13, and second engagement portions 19 and 19 engaged with second hook portions 17 and 17 in the lower rail 12 are respectively formed in front end sides of both side portions 13b and 13b of the main body portion 13a in the upper rail 13.

A slider 25 having an elastic force is inserted between the slider receiving portions 12c and 12c in the lower rail 12 and the slider receiving portions 13c and 13c in the upper rail 13.

The slider 25 is formed by a synthetic resin material or the like, and can apply an elastic force by forming a slit such as a V-shaped groove 25a or the like in a longitudinal direction.

Since the slider 25 is positioned at upper ends of both side portions 13b and 13b of the main body portion 13a in the upper rail 13, it is possible to reduce a frictional resistance in a vertical direction and a lateral direction. A roller 27 is inserted between the step portions 12f and 12f in the bottom portion of the main body portion 12a in the lower rail 12 and the upper walls 13d and 13d of the main body portion 13a in the upper rail 13. The roller 27 is mounted to a roller shaft 27c. A serration 27g is formed at one end of the roller shaft 27c, and the serration 27g is pressure inserted to a through hole formed in the side portion 13b of the main body portion 13a in the upper rail 13.

Both side portions 27a and 27a of the roller 27 are formed so as to have a larger diameter than that of a center portion 27b, and the roller 27 is divided into right and left sections at a substantially center position of the center portion 27b, whereby a pair of left and right roller portions 27A and 27B are formed. An elastic washer 28 is provided between the left and right roller portions 27A and 27B, and an elastic washer 28 corresponding to an elastic body is inserted to the roller shaft 27c. The elastic washer 28 can be formed by a central plain washer and bent washers brought into contact with both sides of the plain washer. In this case, the elastic washer 28 corresponding to the elastic body can be formed by a coil spring, a rubber or the like, can employ any shape and material, and in brief, can be structured such as to move the left and right roller portions 27A and 27B in a lateral direction due to a load applied from the lateral direction.

A taper surface 41 is formed on outer peripheries of both side portions 27a and 27a in the left and right roller portions 27A and 27B, and the taper surface 41 is formed so as to have a smaller diameter according to moving toward the outer side. The taper surfaces 41 of both side portions 27a and 27a in the left and right roller portions 27A and 27B are mounted on taper surfaces 43 formed in the step portions 12f of the bottom portion of the main body portion 12a in the lower rail 12 and downward inclined toward the center in the width direction.

It is possible to absorb a dispersion in the vehicle body mounting portion and a dispersion between the lower rail 12 and the upper rail 13, by dividing the roller 27 into the left and right roller portions 27A and 27B, and in the case that an unreasonable force is applied, the elastic washer 28 deforms as shown in FIG. 4, and the upper rail 13 is inclined, whereby the dispersion is absorbed, and it is possible to obtain a smooth sliding motion without increasing a sliding resistance.

Further, both side portions 27a and 27a of the left and right roller portions 27A and 27B are mounted on the upper ends of the step portions 12f and 12f in the bottom portion of the main body portion 12a in the lower rail 12, whereby a side space can be secured between the small diameter center portion 27b and the bottom portion of the main body portion 12a in the lower rail 12, and the step portions 12f and 12f are formed in the bottom portion, so that it is possible to improve a strength.

Further, as shown in FIG. 6, at a time of fastening a vehicle body mounting bracket 45 to the bottom portion in the lower rail 12 by a rivet 47, there is no risk that a head portion 47a of the rivet 47 is brought into contact with the roller 27 due to an existence of the wide space mentioned above. In this case, a circular arc shaped notch portion 12g capable of inserting the head portion 47a of the rivet 47 therethrough is formed in each of the upper side portions 12d and 12d in the lower rail 12 in the side of the opening portion 12e, thereby easily fastening by the rivet 47.

Further, a clearance 49 is formed between the end portions of both side portions 27a and 27a in the left and right roller portions 27A and 27B, and the inner side wall of the side portion 13b of the main body portion 13a in the upper rail 13, and the structure is made such that the main body portion 13a of the upper rail 13 can move in a lateral direction as shown in FIG. 5 due to the clearance 49. It is possible to absorb a rattle in a width direction by the clearance 49 according to a lateral movement of the upper rail 13. In this case, at a time of absorbing the rattle in a direction of slope and the width direction, a shape of the slider 25 deforms in a following manner.

According to the structure mentioned above, even when a peeling load is applied to the lower rail 12 and the upper rail 13 from a vertical direction, the first hook portions 15 and 15 and the first engagement portions 18 and 18 provided between both rails 12 and 13 are engaged, and the second hook portions 17 and 17 and the second engagement portions 19 and 19 are engaged, whereby it is possible to temporarily obtain a peeling preventing function, so that even when the peeling load is largely applied, it is possible to easily and securely obtain a peeling prevention in a desired state.

The latch 32 corresponding to the lock mechanism is operated by the operating lever 51, as shown in FIG. 6. A shaft lock 54 is connected to the operating lever 51 via a bush 55, an operating piece 54a of the shaft lock 54 is mounted to the latch 32 by a rivet lock 56, and a wave washer 57 and an E ring 58 are respectively mounted to the rivet lock 56 on a back surface of the latch 32. A spring 60 urging in a locking direction is mounted to the operating lever 51. In this case, reference numeral 62 denotes a nut for fixing the operating lever 51. Further, a protrusion 65 for preventing the latch 32 or the like from being interfered with the floor carpet is formed at upper and lower positions of both side portions 12b and 12b in the lower rail 12.

Second Embodiment

A description will be in detail given below of a second embodiment of a seat slide apparatus according to the present invention with reference to the accompanying drawings. In this case, the same reference numerals are attached to the same elements as those of the first embodiment mentioned above, and a detailed description will be omitted.

Figure 7:
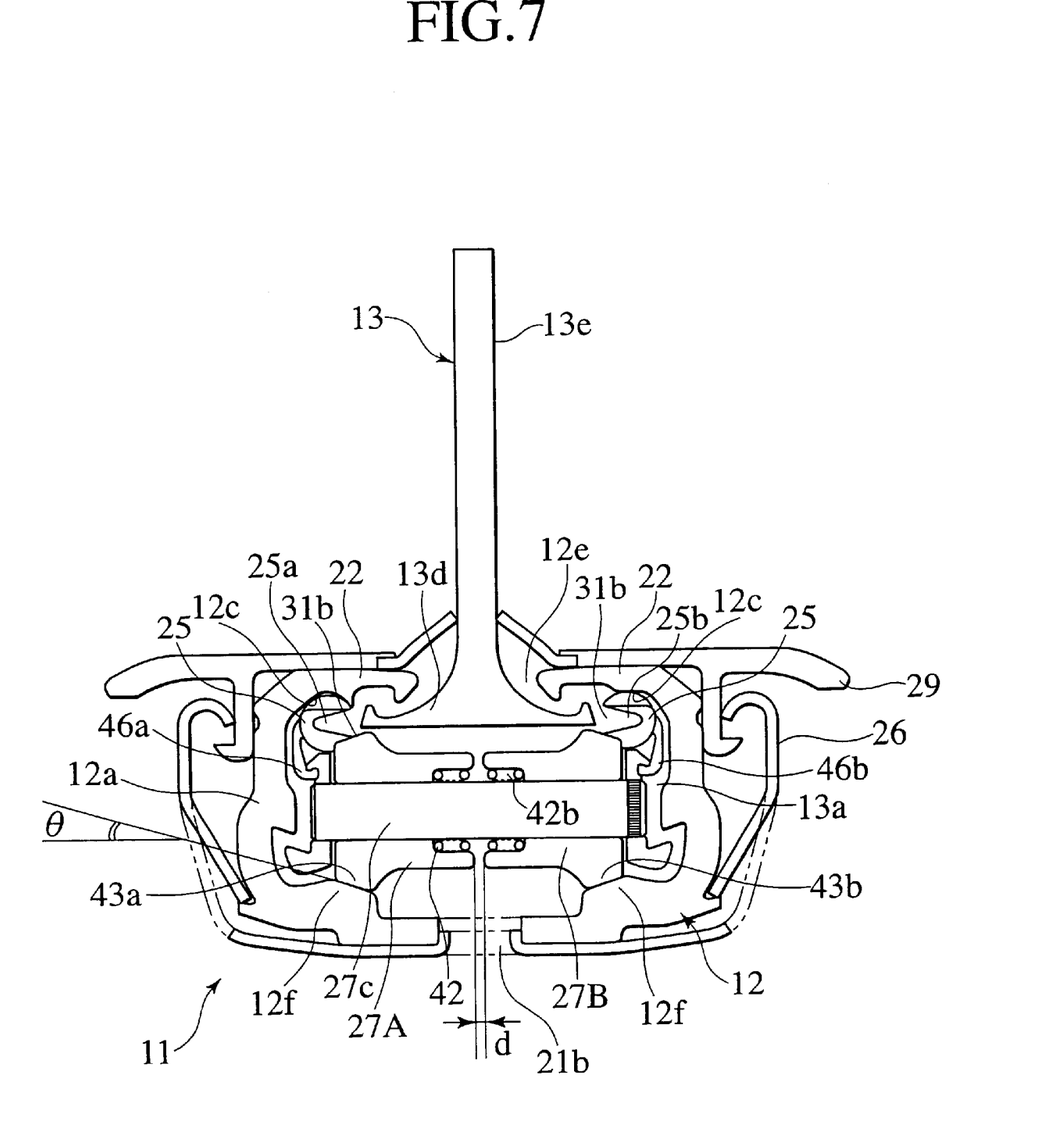
FIG. 7 is a cross sectional view of a main portion showing a second embodiment of a seat slide apparatus according to the present invention.
Figure 8:
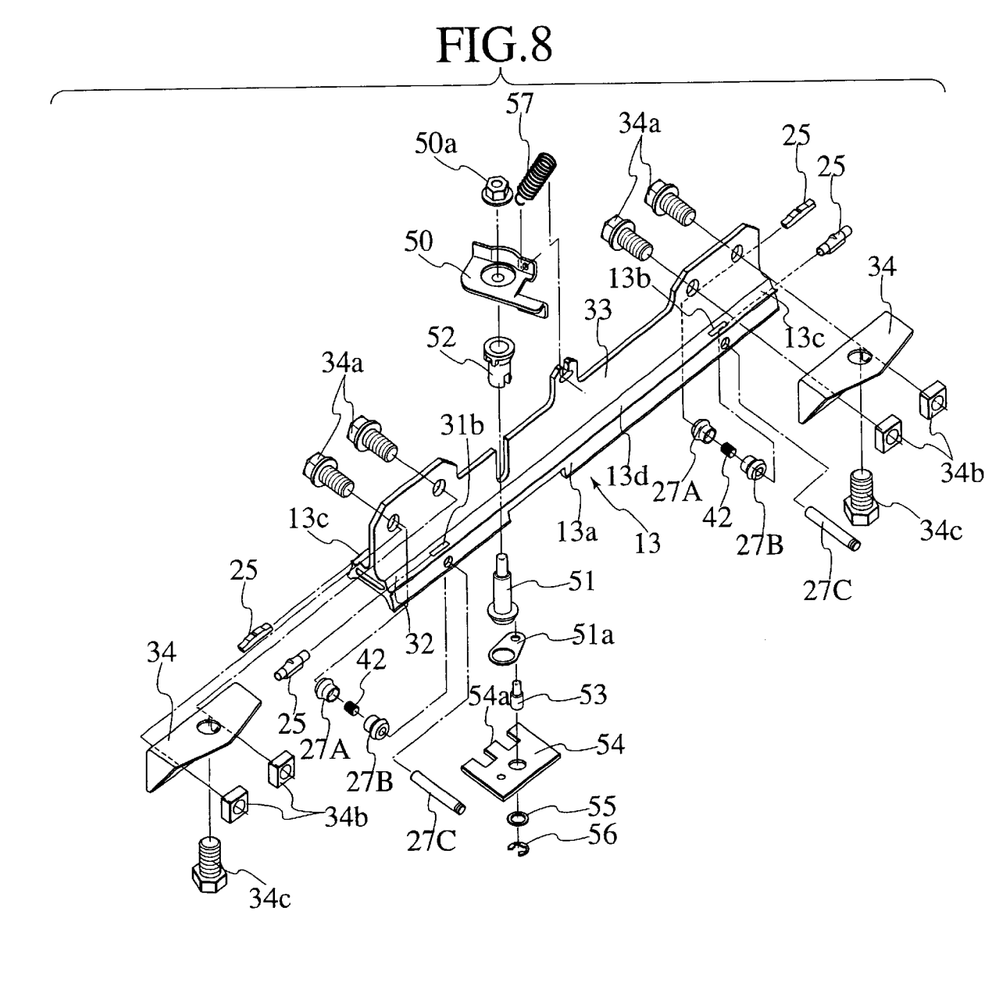
FIG. 8 is an exploded perspective view showing a structure of an upper rail in the seat slide apparatus shown in FIG. 7.

A seat slide apparatus 11 according to the second embodiment is, as shown in FIGS. 7 and 8, mainly constituted by a lower rail 12 mounted on a floor surface of a vehicle body along a longitudinal direction of a vehicle, and an upper rail 13 received within the lower rail 12, freely sliding along the longitudinal direction of the vehicle, mounted to a side of a seat main body (not shown), and supporting the seat main body.

The lower rail 12 is structured such that a main body portion 12a formed in a substantially upward-C shape, a pair of right and left flanges 22 extended by being bent inward from upper ends of both side portions of the main body portion 12a and having an opening portion 12e are formed, roller receiving step portions 12f receiving a roller mentioned below are provide in both sides of the bottom portion in the main body portion 12a so as to form a downward slope toward a center, and slider receiving portions 12c for receiving a slider are formed on inner surfaces of shoulder portions in the lower rail 12.

On the contrary, the upper rail 13 has a main body portion 13a formed in a substantially downward-C shape so as to be received within the main body portion 12a in the lower rail 12, slider receiving portions 13c formed in both shoulder portions of the main body portion 13a, and a vertical wall 13e protruding upward from a center of an upper wall 13d in the main body portion 13a and protruding upward from the opening portion 12e in the lower rail 12.

Next, in order to smoothly slide the upper rail 13 along a longitudinal direction of the lower rail 12, in the seat slide apparatus 11 according to the present embodiment, rollers 27A and 27B having a laterally two-piece separated structure are received within the main body portion 13a of the upper rail 13, and the rollers 27A and 27B are pivoted so as to be capable of being rotated by a roller shaft 27c mounted to the main body portion 13a in the upper rail 13.

Further, since recess portions 42a and 42b receiving a coil spring 42 are provided on inner peripheral surfaces of the respective rollers 27A and 27B in order to receive the coil spring interposed on an outer peripheral surface of the roller shaft 27c, an elastic effect is applied to the rollers 27A and 27B along an axial direction.

Further, a pair of left and right rollers 27A and 27B are structured such that sliding portions 43a and 43b are brought into contact with the roller receiving step portions 12f in the lower rail 12, the contact surfaces are in contact with a slope having an angle of 23 degrees shown by θ in FIG. 7, and the right and left contact surfaces are set to be in a concentric circular arc shape.

Further, openings 31b are provided in upper sides of the rollers 27A and 27B in order to avoid an interference with the inner surface of the shoulder portion of the main body portion 13a in the upper rail 13.

Next, sliders 25 are provided in sides of terminals from the placing portions of the rollers 27A and 27B. The sliders 25 are received between slider receiving portions 12c in the lower rail 12 and a slider receiving portions 13c in the upper rail 13, have V-shaped grooves 25a and 25b formed therein, are constituted by a synthetic resin molded product capable of deforming in a diametrical direction, and are fixed to the main body portion 13a in the upper rail 13 by engaging engagement hooks 46a and 46b. In this case, an outer periphery of the lower rail 12 is covered by a lower rail finisher 29 and a finisher bracket 26.

Further, with respect to the upper rail 13, as shown in FIG. 8, a pair of left and right rollers 27A and 27B are pivoted to both end portions in a longitudinal direction in the manner as mentioned above by the roller shaft 27c, and the sliders 25 are mounted in the side of the terminal end from the rollers 27A and 27B, however, in order that both end portions in the longitudinal direction in the upper rail 13 are mounted to the side of the seat main body (not shown), leg brackets 34 are adhered to the vertical wall 13e in the upper rail 13 by bolts 34a and weld nuts 34b, and the leg brackets 34 are adhered to the seat main body (not shown) by stud bolts 34c.

A description will be given of a lock mechanism between the lower rail 12 and the upper rail 13 with reference to FIG. 8. A shaft lock 51 is connected to an operating lever 50 via a-bush 52, an operating piece 51a of the shaft lock 51 is mounted to a latch 54 by a rivet lock 53, and a wave washer 55 and an E ring 56 are respectively mounted to the rivet lock 53 on a back surface of the latch 54. Further, a spring 57 for urging in a lock direction is mounted to the operating lever 50. In this case, reference numeral 50a denotes a nut for fixing the operating lever 50.

Then, by the operating lever 50, the latch 54 moves forward and backward and a latch pawl 54a engages with a latch hole (not shown) in the lower rail 12, whereby the upper rail 13 is locked with the lower rail 12 at a predetermined slide position.

Therefore, according to the seat slide apparatus 11 of the present invention, since a pair of left and right rollers 27A and 27B pivoted to the roller shaft 27c are urged in an outer direction by the coil spring 42, a spring property along an axial direction is applied to the rollers 27A and 27B and a gap (shown by reference symbol d in FIG. 7) between the rollers is set between the left and right rollers 27A and 27B, it is possible to absorb a dispersion in the vehicle body mounting portion and a dispersion between the lower rail 12 and the upper rail 13.

In particular, as in the present embodiment, since the coil spring 42 for urging the rollers 27A and 27B outward is received within the rollers 27A and 27B, it is possible to measure the gap d between the rollers 27A and 27B by a thickness gauge or the like through the opening 21b provided in the lower portion of the main body portion 12a in the lower rail 12, whereby a quality control can be easily performed, and it is possible to easily treat by measuring the gap d between the rollers 27A and 27B even in the case that the dispersion can not be absorbed, so that a quality control can be easily performed.

Further, according to the seat slide apparatus 11 of the present embodiment, since the sliding portions 43a and 43b of a pair of left and right rollers 27A and 27B are brought into contact with the roller receiving step portions 12f so as to form a concentric arc, it is possible to absorb a size dispersion in the slide parts, and it is possible to do away with a selective fitting.

In addition, since the portion between the sliding portions 43a and 43b of a pair of left and right rollers 27A and 27B and the roller receiving step portions 12f in the side of the lower rail 12 is set to be formed in a gentle slope shape with about 23 degrees, and a coefficient of friction between both elements is significantly small, the rollers 27a and 27b hardly have a deflection, and a rattle and an abnormal sound (a low end sound) are not generated.

Figure 9:
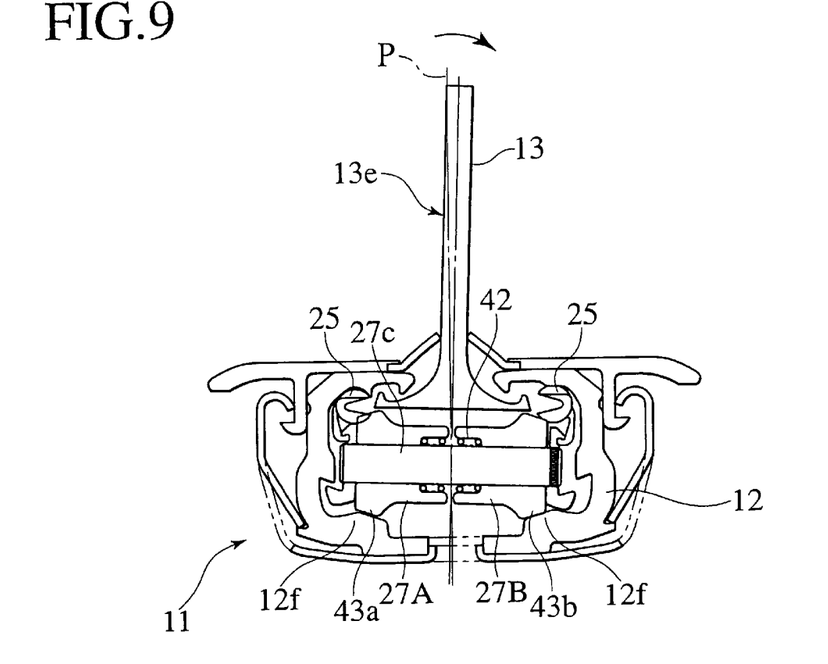
FIG. 9 is a cross sectional view of a state that the upper rail in the seat slide apparatus shown in FIG. 7 is inclined.

Next, when the upper rail 13 in the seat slide apparatus 11 according to the present invention is inclined in a direction of an arrow on the basis of a center line P, the sliding surfaces 43a and 43b of the rollers 27A and 27B are inclined along the circular arc surface with respect to the roller receiving step portions 12f in the lower rail 12 due to the slope of the vertical wall 13e in the upper rail 13, as shown in FIG. 9.

Then, a surface pressure between the rollers 27A and 27B and the lower rail 12 and a surface pressure between the sliders 25 and the slider receiving portions 13c in the upper rail 13 are increased, the sliding resistance is increased, however, and it is possible to prevent an increase of surface pressure due to the elastic effect of the rollers 27A and 27B and the sliders 25 so as to prevent an increase of the sliding resistance, whereby it is expected to smoothly slide the seat slide apparatus 11 even in the case that the upper rail 12 is in an inclined state.

Figure 10:
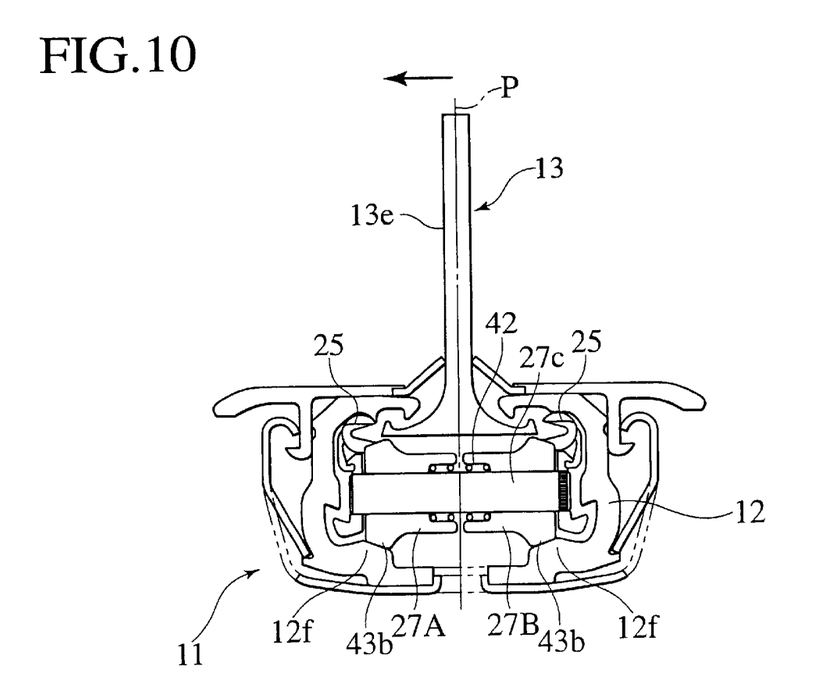
FIG. 10 is a cross sectional view of a state that the upper rail in the seat slide apparatus shown in FIG. 7 moves laterally.

Further, if a clearance is set between a pair of left and right rollers 27A and 27B and the main body 13a in the upper rail 13, in the case the upper rail 13 moves in a direction of an arrow as shown in FIG. 10, a ground contact surface between the roller 27A and 27B and the roller receiving step portions 12f in the lower rail 12 is not changed due to the clearance set between the rollers 27A and 27B and the main body portion 13a in the upper rail 13, only the upper rail 13 moves in a lateral direction, and the rollers 27A and 27B does not move.

Further, it is possible to prevent an increase of sliding resistance by restricting a surface pressure between the rollers 27A and 27B and the lower rail and a surface pressure between the sliders 25 and the ground contact surface in the upper rail 13 due to the elastic effect of a pair of left and right rollers 27A and 27B and the sliders 25. Accordingly, even when the upper rail 13 moves in the lateral direction, a smooth sliding operation can be kept.

Third Embodiment

Figure 11:
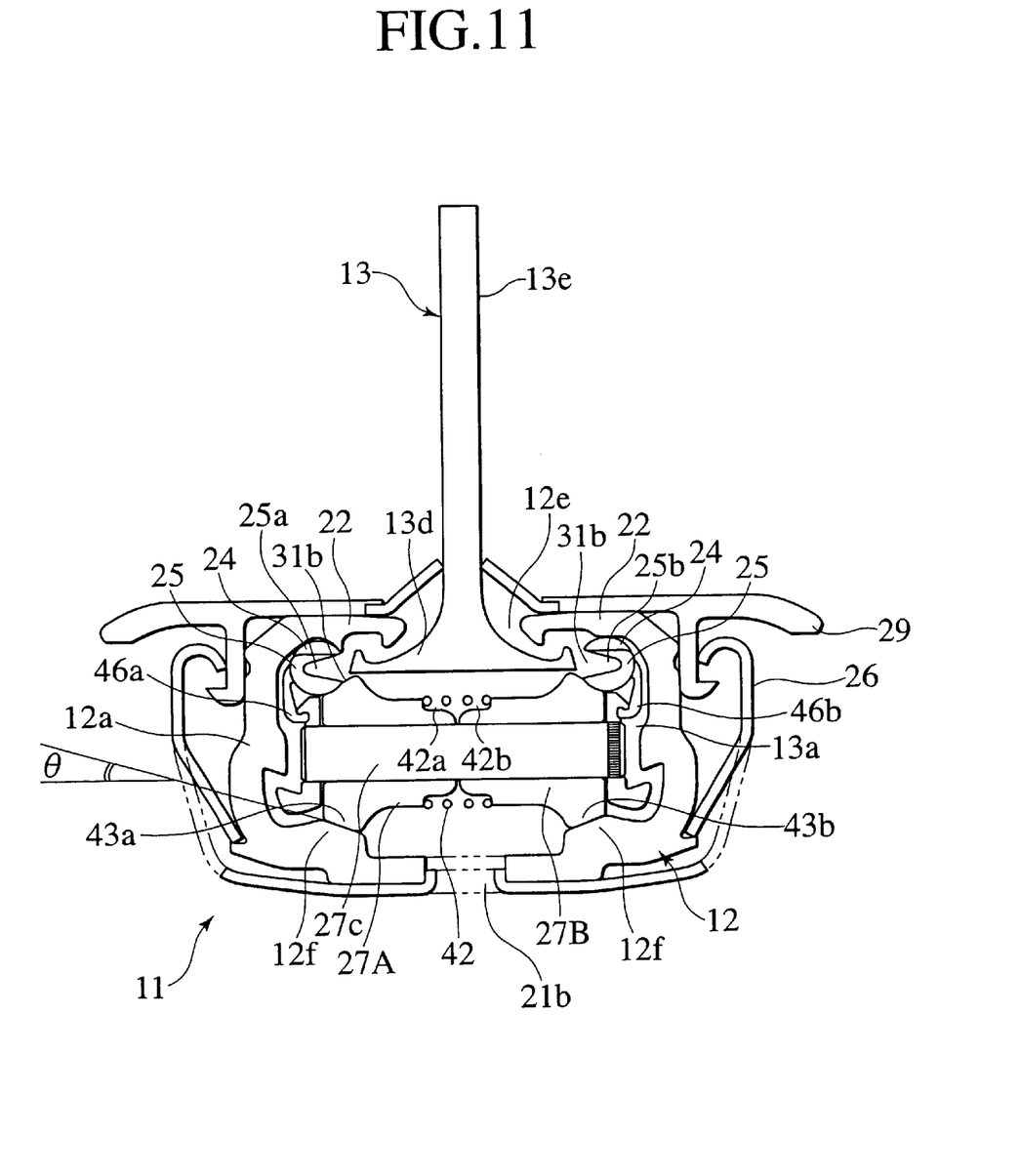
FIG. 11 is a cross sectional view of a main portion showing a third embodiment of a seat slide apparatus according to the present invention.

FIG. 11 shows a third embodiment of a seat slide apparatus 11 according to the present invention. The same reference numerals are attached to the same elements as those of the embodiment mentioned above, and a detailed description thereof will be omitted. According to this embodiment, a coil spring 42 for urging a pair of left and right rollers 27A and 27B is received within receiving recess portions 42a and 42b formed on outer peripheral surfaces of a pair of left and right rollers 27A and 27B.

Figure 12:
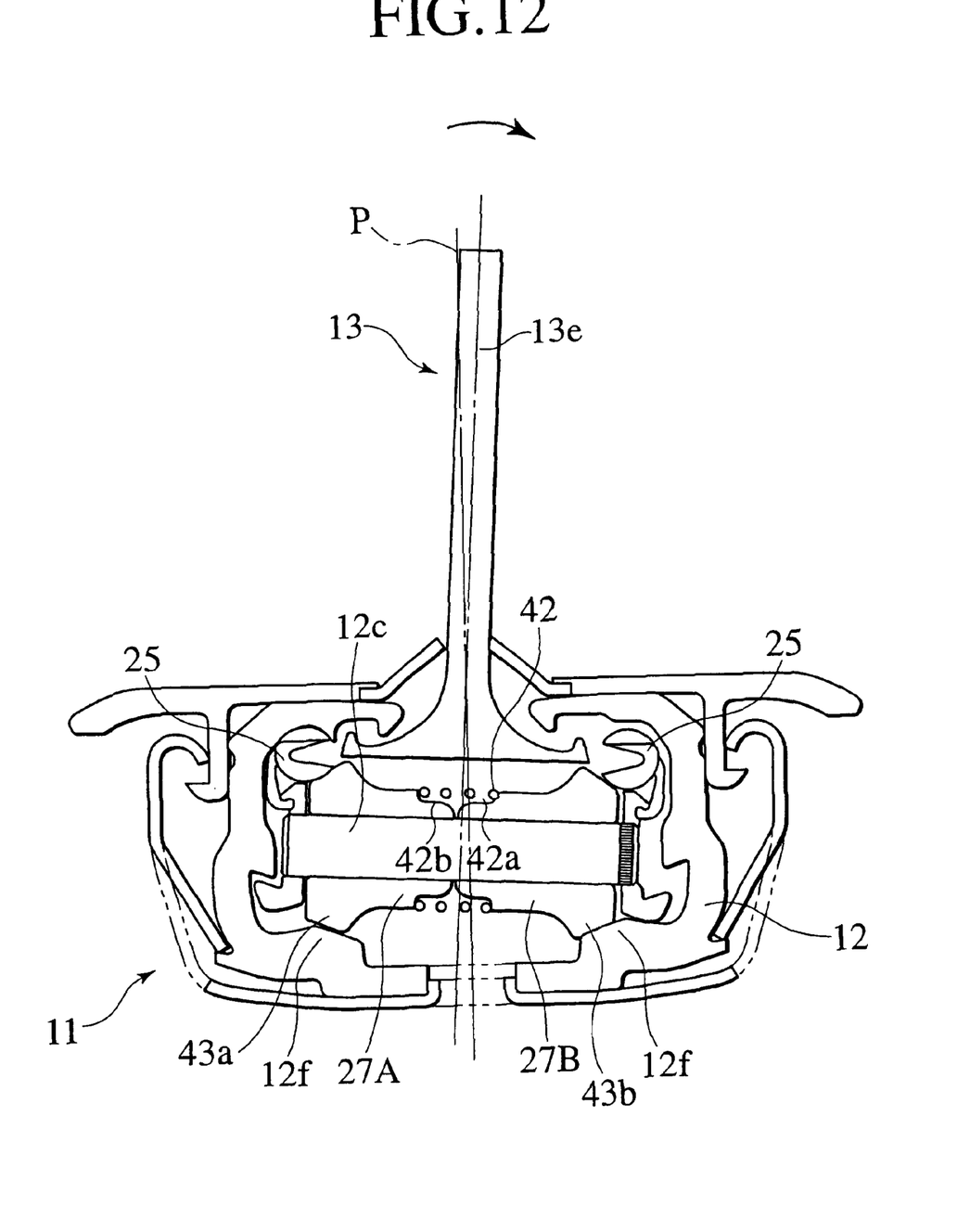
FIG. 12 is a cross sectional view of a state that an upper rail in the seat slide apparatus shown in FIG. 11 is inclined.
Figure 13:
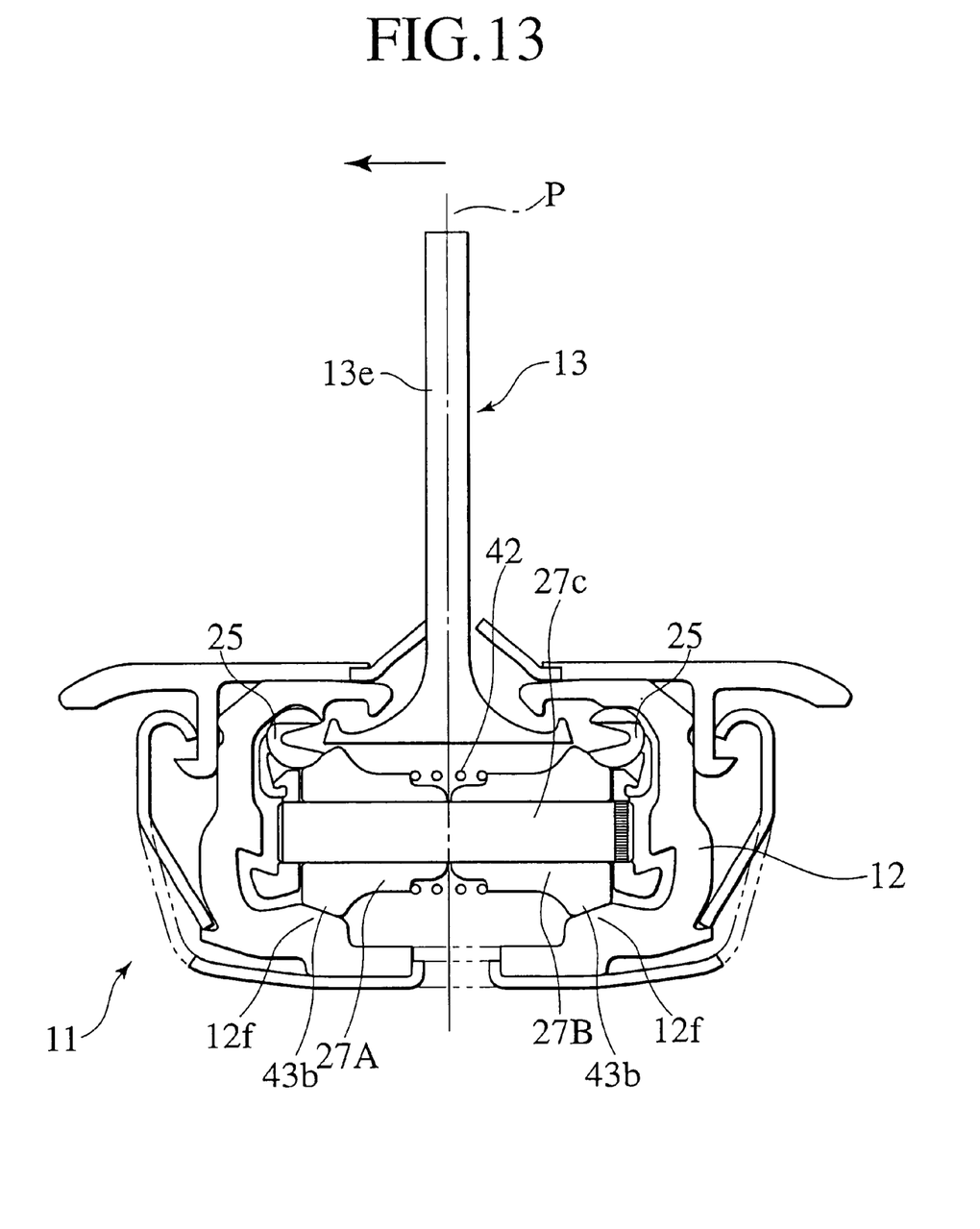
FIG. 13 is a cross sectional view of a state that the upper rail in the seat slide apparatus shown in FIG. 11 moves laterally.

Accordingly, it is impossible to measure a gap between a pair of left and right rollers 27A and 27B, however, since an elasticity is applied to the rollers 27A and 27B due to a spring property of the coil spring 42, it is possible to effectively absorb a dispersion in a vehicle body mounting portion and sliding parts, and even when the upper rail 13 is input so as to form a slope as shown in FIG. 12, no rattle is generated due to the rollers 27A and 27B and roller receiving step portions 12f being set to a concentric arc shaped ground contact surface and an elastic effect of the rollers 27A and 27B and the sliders 25, so that a smooth sliding operation can be expected. In the same manner, as shown in FIG. 13, even when the upper rail 13 moves in a lateral direction, a smooth sliding operation as mentioned above can be kept.

In this case, the present invention is not limited to the structures according to the embodiments mentioned above, it is free to suitably modify and change the shape, the structure and the like of the respective portions in the seat slide apparatus, and various modified embodiments including the shape and the material of the respective rails as mentioned above are included in the scope of the present invention.

What is claimed is:

1. A seat slide apparatus comprising:
   a lower rail mounted to be long in a longitudinal direction of a seat mounting floor surface; and
   an upper rail guided and supported so as to freely slide in a longitudinal direction on the lower rail and mounted and fixed to a side of a seat main body, wherein
   the lower rail having a main body portion formed in a substantially upward-C shape and a pair of left and right upper side portions extended inward from front end sides of both side portions in the main body portion so as to form an opening portion, roller receiving step portions are formed in both sides of a bottom portion in the main body portion, circular arc surfaces formed in the roller receiving step portions, and a slider receiving portion provided in a lower surface side of the upper side portion; and
   the upper rail having a main body portion formed in a substantially downward-C shape so as to be assembled in the lower rail, a vertical wall protruding upward from a center of an upper wall in the main body portion and protruding upward from the opening portion of the upper side portion in the lower rail, and a slider receiving portion formed at an upper end of the upper wall in the main body portion, wherein a slider is inserted between the slider receiving portion in the lower rail and the slider receiving portion in the upper rail, a roller is inserted between a step portion of the bottom portion in the main body portion of the lower rail and the upper wall in the main body portion of the upper rail, the roller is pivoted to roller shafts mounted to both side portions in the main body portion of the upper rail, and separated into left and right sections at a substantially center portion of the roller, and both side portions of the roller are mounted on taper surfaces downward inclined toward a center in a width direction formed in the step portion of the bottom portion in the main body portion of the lower rail.

2. A seat slide apparatus according to claim 1, wherein the slider is formed by a synthetic resin, and a V-shaped groove is provided in a longitudinal direction.

3. A seat slide apparatus comprising:
   a lower rail mounted to be long in a longitudinal direction of a seat mounting floor surface; and
   an upper rail guided and supported so as to freely slide in a longitudinal direction on the lower rail and mounted and fixed to a side of a seat main body,
   wherein the lower rail has a main body portion formed in a substantially upward-C shape and a pair of left and right upper side portions extended inward from front end sides of both side portions in the main body portion so as to form an opening portion, roller receiving step portions are formed in both sides of a bottom portion in the main body portion, circular arc surfaces formed in the roller receiving step portions, and a slider receiving portion provided in a lower surface side of the upper side portion; wherein
   the upper rail has a main body portion formed in a substantially downward-C shape so as to be assembled in the lower rail, a vertical wall protruding upward from a center of an upper wall in the main body portion and protruding upward from the opening portion of the upper side portion in the lower rail, and a slider receiving portion formed at an upper end of the upper wall in the main body portion of the upper rail, and wherein
   a slider is inserted between the slider receiving portion in the lower rail and the slider receiving portion in the upper rail, a roller supported by roller shafts is inserted between a step portion of the bottom portion in the main body portion of the lower rail and the upper wall in the main body portion of the upper rail, both side portions of the roller are formed so as to have a larger diameter than that of a center portion thereof, the roller is separated into right and left sections at a substantially center portion of the roller, taper surfaces are formed in both side portions of the roller, and the taper surface of both side portions in the roller are mounted on taper surfaces downward inclined toward a center in a width direction formed in the step portion of the bottom portion in the main body portion of the lower rail.

4. A seat slide apparatus comprising:
   a lower rail mounted to be long in a longitudinal direction of a seat mounting floor surface; and
   an upper rail guided and supported so as to freely slide in a longitudinal direction on the lower rail and mounted and fixed to a side of a seat main body, wherein the lower rail has a main body portion formed in a substantially upward-C shape and a pair of right and left upper side portions extended inward from front end sides of both side portions in the main body portion so as to form an opening portion, roller receiving step portions are formed in both sides of a bottom portion in the main body portion, circular arc surfaces formed in the roller receiving step portions, and a slider receiving portion provided in a lower surface side of the upper side portion, wherein the upper rail has a main body portion formed in a substantially downward-C shape so as to be assembled in the lower rail, a vertical wall protruding upward from a center of an upper wall in the main body portion and protruding upward from the opening portion of the upper side portion in the lower rail, and a slider receiving portion formed at an upper end of the upper wall in the main body portion of the upper rail, and wherein a slider is inserted between the slider receiving portion in the lower rail and the slider receiving portion in the upper rail, a roller supported by roller shafts is inserted between a step portion of the bottom portion in the main body portion of the lower rail and the upper wall in the main body portion of the upper rail, both side portions of the roller are formed so as to have a larger diameter than that of a center portion thereof, the roller is separated into right and left sections at a substantially center portion of the roller, an elastic body is inserted to the roller shaft at the separated position of the substantially center portion of the roller, taper surfaces are formed in both side portions of the roller, and the taper surface of both side portions in the roller are mounted on taper surfaces downward inclined toward a center in a width direction formed in the step portion of the bottom portion in the main body portion of the lower rail.

5. A seat slide apparatus comprising:

a lower rail mounted to be long in a longitudinal direction of a seat mounting floor surface; and an upper rail guided and supported so as to freely slide in a longitudinal direction on the lower rail and mounted and fixed to a side of a seat main body, wherein the lower rail has a main body portion formed in a substantially upward-C shape and a pair of left and right upper side portions extended inward from front end sides of both side portions in the main body portion so as to form an opening portion, roller receiving step portions are formed in both sides of a bottom portion in the main body portion, circular arc surfaces formed in the roller receiving step portions, and a slider receiving portion provided in a lower surface side of the upper side portion, wherein the upper rail has a main body portion formed in a substantially downward-C shape so as to be assembled in the lower rail, a vertical wall protruding upward from a center of an upper wall in the main body portion and protruding upward from the opening portion of the upper side portion in the lower rail, and a slider receiving portion formed at an upper end of the upper wall in the main body portion of the upper rail, and wherein a slider is inserted between the slider receiving portion in the lower rail and the slider receiving portion in the upper rail, a roller formed in roller shafts is inserted between a step portion of the bottom portion in the main body portion of the lower rail and the upper wall in the main body portion of the upper rail, both side portions of the roller are formed so as to have a larger diameter than that of a center portion thereof, the roller is separated into right and left sections at a substantially center portion of the roller, an elastic washer is inserted to the roller shaft at the separated position in the substantially center portion of the roller, taper surfaces are formed in both side portions of the roller, the taper surface of both side portions in the roller are mounted on taper surfaces downward inclined toward a center in a width direction formed in the step portion of the bottom portion in the main body portion of the lower rail, and a clearance is provided between a front end portion of the roller and a side wall of the main body portion in the upper rail.

6. A seat slide apparatus according to claim 5, wherein the elastic washer is formed by a central plain washer and a bent washer brought into contact with both sides of the plain washer.

7. A seat slide apparatus comprising:

a lower rail mounted along a longitudinal direction of a vehicle floor surface; and an upper rail guided and supported so as to freely slide in a longitudinal direction on the lower rail and mounted and fixed to a side of a seat main body, wherein the lower rail has a main body portion formed in a substantially upward-C shape and a pair of left and right flanges extended inward from front end sides of both side portions in the main body portion so as to form an opening portion, and roller receiving step portions formed in both sides of a bottom portion in the main body portion, wherein the upper rail has a main body portion formed in a substantially downward-C shape so as to be received in the main body portion of the lower rail, a vertical wall protruding upward from a center of an upper wall in the main body portion and protruding upward from the opening portions of both side portions in the lower rail so as to form a mounting portion to the seat main body, and wherein a pair of left and right rollers are inserted between a roller receiving step portion provided in the main body portion in the lower rail and an upper wall of the main body portion in the upper rail, the pair of right and left rollers are pivoted to roller shafts mounted to both side portions of the main body portion in the upper rail, a coil spring is interposed between a pair of right and left rollers, a spring property along an axial direction is applied to the mutual rollers, and sliding portions of the left and right rollers are brought into contact with the roller receiving step portions in the lower rail so as to form a concentric arc.

8. A seat slide apparatus according to claim 7, wherein a pair of left and right rollers pivoted to the roller shafts have spring receiving recess portions on respective inner peripheral surfaces, and the spring is received within the roller, thereby making it possible to measure a gap size between the right and left rollers through the opening on the lower surface of the lower rail.

9. A seat slide apparatus according to claim 7, wherein a slider receiving portion is formed in an inner surface side of the flange of the lower rail, a slider receiving portion is formed in a shoulder portion of the upper wall in the upper rail main body portion, and a slider capable of elastically deforming in a diametrical direction is inserted between the slider receiving portion in the lower rail and the slider receiving portion in the upper rail.

10. A seat slide apparatus according to claim 9, wherein the slider is formed by a synthetic resin, and a V-shaped groove is provided in a longitudinal direction.

11. A seat slide apparatus according to claim 9, wherein the slider is engaged with and fixed to an engagement pawl provided in the main body portion of the upper rail.

12. A seat slide apparatus comprising:

a lower rail mounted to be long in a longitudinal direction of a seat mounting floor surface, having a main body portion formed in a substantially upward-C shape and a pair of left and right upper side portions extended inward from front end sides of both side portions in the main body portion so as to form an opening portion, and roller receiving step portions are formed in both sides of a bottom portion in the main body portion;

an upper rail guided and supported so as to freely slide in a longitudinal direction on the lower rail and mounted and fixed to a side of a seat main body, having a main body portion formed in a substantially downward-C shape so as to be assembled in the lower rail, and a vertical wall protruding upward from a center of an upper wall in the main body portion and protruding upward from the opening portion of the upper side portion in the lower rail; and a roller inserted between a step portion of the bottom portion in the main body portion of the lower rail and the upper wall in the main body portion of the upper rail, pivoted to roller shafts mounted to both side portions in the main body portion of the upper rail, and separated into right and left sections at a substantially center portion of the roller, and both side portions of the roller are mounted to the step portion of the bottom portion in the main body portion of the lower rail, wherein the lower rail has a first hook portion formed in the front end portion in the side of the opening portion of the main body portion in the lower rail, and second hook portions formed in both side portions of the main body portion, and the upper rail has a first engagement portion formed on the upper wall of the upper rail, and second engagement portions formed in the side of the front ends of both side portions of the main body portion in the upper rail, wherein the first hook portion is engaged with the first engagement portion, and the second hook portions are respectively engaged with the second engagement portions.

* * * * *